United States Patent [19]
Downes

[11] Patent Number: 6,029,980
[45] Date of Patent: Feb. 29, 2000

[54] FLUID SIDE CONTAMINATION EXCLUSION SEALING LIP FOR RADIAL SHAFT SEALS

[75] Inventor: Michael Downes, Meredith, N.H.

[73] Assignee: Freudenberg-NOK General Partnership, Plymouth, Mich.

[21] Appl. No.: 08/932,510

[22] Filed: Sep. 18, 1997

[51] Int. Cl.[7] ............................................. F16J 15/32
[52] U.S. Cl. ..................... 277/552; 277/559; 277/565; 277/584
[58] Field of Search .................................. 277/549, 552, 277/559, 562, 565, 584, 550

[56] References Cited

U.S. PATENT DOCUMENTS

| | | |
|---|---|---|
| 3,561,770 | 2/1971 | Corsi et al. . |
| 3,692,318 | 9/1972 | Day et al. . |
| 4,336,945 | 6/1982 | Christiansen et al. . |
| 4,401,307 | 8/1983 | Dechavanne ............................... 277/50 |
| 4,427,206 | 1/1984 | Sugiyama ................................ 277/153 |
| 4,522,411 | 6/1985 | Burgan . |
| 4,667,968 | 5/1987 | Nash et al. ............................... 277/134 |
| 4,770,548 | 9/1988 | Otto . |
| 4,848,776 | 7/1989 | Winckler . |
| 4,943,068 | 7/1990 | Hatch et al. . |
| 4,962,936 | 10/1990 | Matsushima . |
| 5,183,271 | 2/1993 | Wada et al. ............................... 277/152 |
| 5,244,215 | 9/1993 | Cather, Jr. et al. . |
| 5,271,629 | 12/1993 | Dahlhaus et al. ........................... 277/23 |
| 5,664,651 | 9/1997 | Miura et al. ....................... 188/322.17 |

*Primary Examiner*—Anthony Knight
*Assistant Examiner*—Alison K. Pickard
*Attorney, Agent, or Firm*—Dinnin & Dunn, PC

[57] ABSTRACT

A radial shaft seal for use on a shaft, said radial shaft seal including a rigid insert generally having a L-shaped cross section. The shaft seal including a circumferential seal body molded around the insert. The shaft seal further including an exclusion lip integral with the seal body, the exclusion lip having a venting mechanism. The venting mechanism allows fluid transfer into the primary sealing lip.

12 Claims, 1 Drawing Sheet

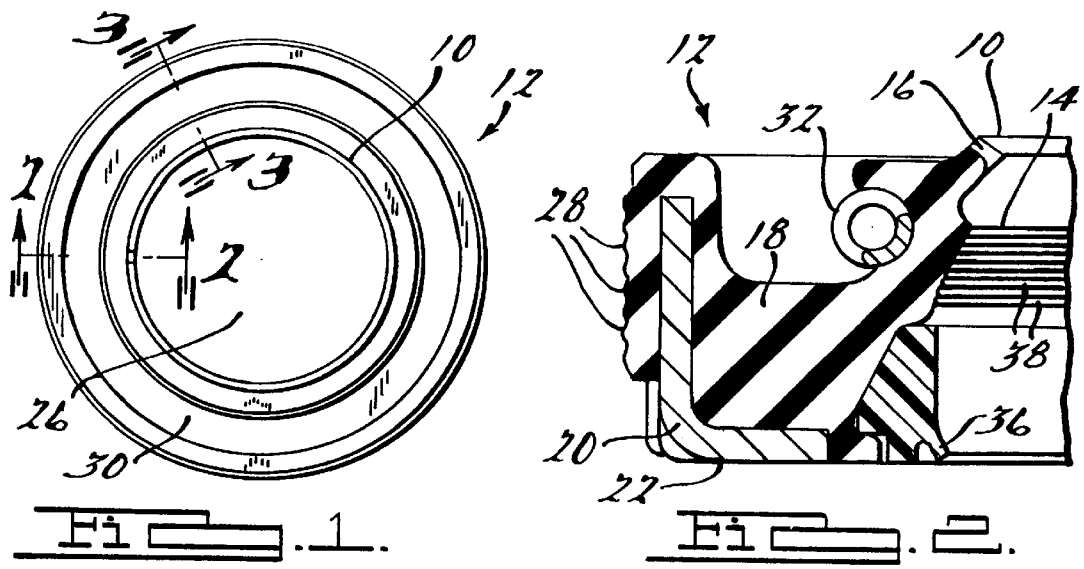
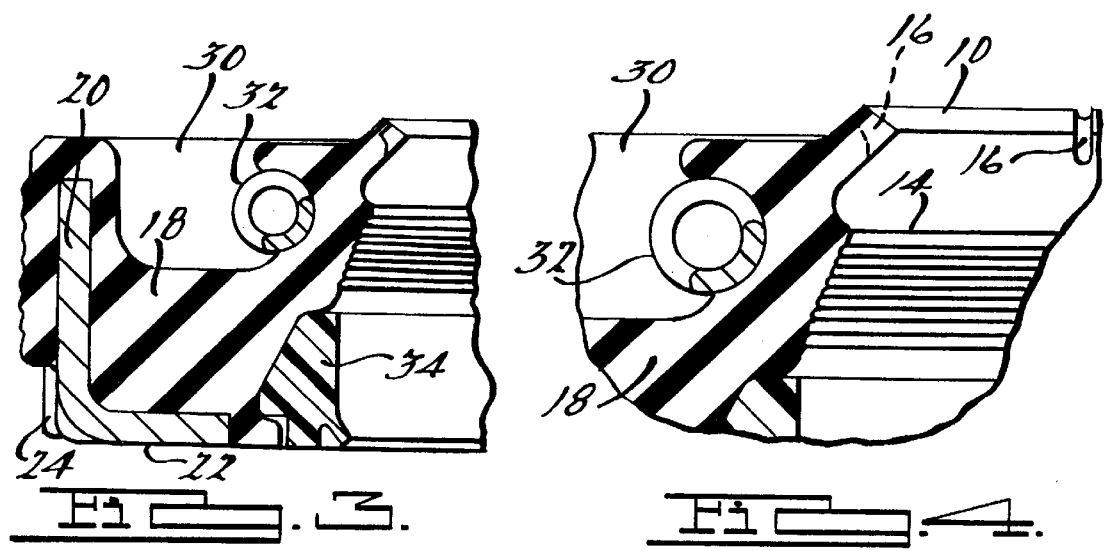
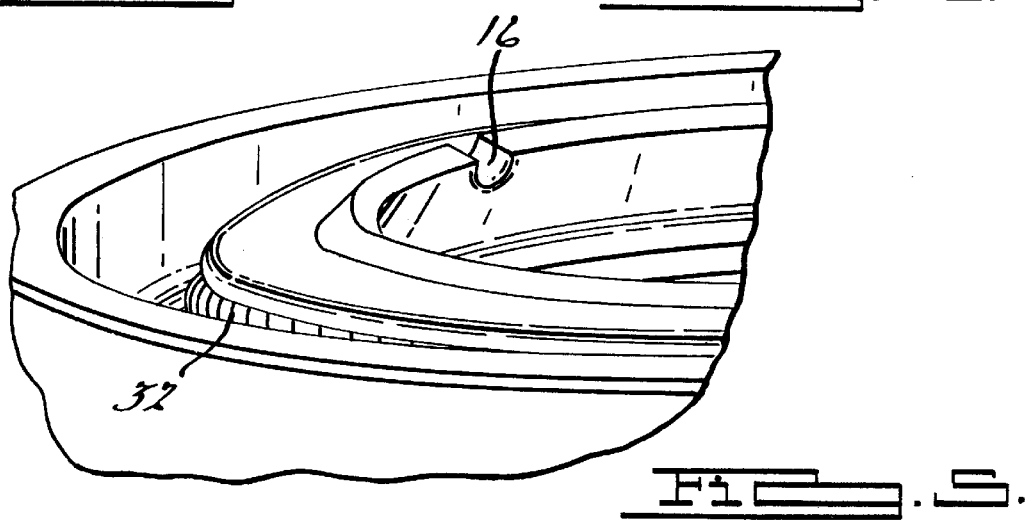

6,029,980

FLUID SIDE CONTAMINATION EXCLUSION SEALING LIP FOR RADIAL SHAFT SEALS

BACKGROUND OF THE INVENTION

1. Field of the Invention

The present invention relates to radial shaft seals, and more particularly to radial shaft seals that include a contamination exclusion sealing lip.

2. Description of Related Art

Radial shaft seals have been known for years. Conventional seals include a rigid casing portion and an elastomeric seal lip. The seal lip includes a primary lip which is comprised of a pair of frusto-conical surfaces that include an oil and air side, these sides create a seal band to retain lubricant within the sealed region. The lubricant may be under pressure. Some of the prior art seals have also included an excluder or secondary lip. The use of this excluder lip is such that contaminates such as grit, dust, metal filings, etc are kept away from the immediate vicinity of the primary sealing lip so as not to create abrasion or otherwise to interfere with the sealing action or effect the seal life of the seal at the primary sealing lip. A typical excluder lip operates with little or no lubricant and usually runs at a higher temperature than the primary lip. The primary lip usually uses a garter spring, wherein excluder lips rarely use such springs. Many of these prior art excluder lips solve some problems but create others. If the excluder lip is too loose then it is ineffective at keeping contaminates out of the primary sealing area. Furthermore, if the excluder lip is too tight it will create excess heat which reduces actual operating time of the seal. In addition, a more specific problem is created when an excluder lip is added to the fluid side of a seal where the fluid is pressurized. The resulting pressure differential created on the two sides of the excluder lip and the resulting excluder lip stress and movement can lead to any of the aforementioned problems.

Therefore, there is a need in the art for a fluid side contamination exclusion seal lip for radial shaft seals that is self-venting and increases seal life while also excluding contaminates from entering the primary sealing lip area.

SUMMARY OF THE INVENTION

One object of the present invention is to provide an exclusion sealing lip that prohibits the ingestion of contaminates from the system fluid into the primary sealing lip area.

Another object of the present invention is to have a contaminate exclusion sealing lip with a venting feature that allows the system fluid to transfer to the primary sealing lip. Thus, establishing pressure equilibrium around the contaminate exclusion sealing lip.

Another object of the present invention is to eliminate the need for additional components to be added to the radial shaft seal.

Yet a further object of the present invention is to provide a radial shaft seal with a fluid side contamination exclusion lip whose dimensions and tolerances are built directly into the seal therefore eliminating the difficulty in maintaining, dimensional and tolerance control over multiple assembled components.

Yet a further object of the present invention is to eliminate the possibility of insufficient assembly of multiple component seals and the possibility of disassembly of the multiple component seal during shipping or assembly.

Yet a further object of the present invention is to provide a radial shaft seal that does not require change to existing manufacturing technology by including a contaminate exclusion sealing lip that is easily added to existing radial shaft seal designs.

To achieve the foregoing objects, a radial shaft seal includes a rigid insert generally having a L-shaped cross-section. This seal also includes a circumferential seal body molded around the insert. Furthermore, the radial shaft seal includes an exclusion lip integral with the seal body. The exclusion lip having a venting mechanism, wherein the venting mechanism allows fluid to transfer to a primary sealing lip.

One advantage of the present invention is that the exclusion sealing lip prohibits the ingestion of contaminates from the system fluid into the primary sealing lip area.

A further advantage of the present invention is that the venting feature of the exclusion sealing lip allows system fluid to transfer to the primary sealing lip thus establishing pressure equilibrium around the contaminate exclusion sealing lip.

Yet another advantage of the present invention is that it eliminates the need for additional components to be added to the radial shaft seal.

Another advantage of the present invention is that the dimensions and tolerances of the contaminate exclusion lip are built directly into the radial shaft seal, therefore, eliminating difficulties inherent in maintaining dimensional and tolerance control over multiple assembled components.

Yet a further advantage of the present invention is that it eliminates the possibility of insufficient assembly of a radial shaft seal and the possibility of disassembly of the multi-component radial shaft seal during shipping or assembly.

Still another advantage of the present invention is that there is no change required to existing radial shaft seal manufacturing technology and the contaminate exclusion lip seal can be easily added into the current shaft seal designs.

Other objects, features and advantages of the present invention will become apparent from the subsequent description and appended claims, taken in conjunction with the accompanying drawings.

BRIEF DESCRIPTION OF THE DRAWING

FIG. 1 shows a plan view of the radial shaft seal.

FIG. 2 shows a cross section taken along Line 2—2 of FIG. 1.

FIG. 3 shows a cross section taken along Line 3—3 of FIG. 1.

FIG. 4 shows an alternate embodiment of the present invention.

FIG. 5 shows a plan view of the present invention.

BEST MODE OF CARRYING OUT THE INVENTION AND DESCRIPTION OF THE PREFERRED EMBODIMENT(S)

Referring to the drawings, a fluid side contamination exclusion sealing lip 10 for a radial shaft seal 12 is shown. The contaminate exclusion sealing lip 10 is integrally molded above the primary sealing lip 14 of a radial shaft seal 12. The contaminate exclusion sealing lip 10 is designed with a venting feature 16 which allows system fluid to transfer to the primary sealing lip 14, thus establishing pressure equilibrium around the contaminate exclusion sealing lip 10 when operating fluid pressure is applied to the system.

The radial shaft seal 12 as shown in FIGS. 1 through 5 includes a circumferential seal body 18 generally having a ring-like appearance. In the preferred embodiment the seal body 18 is made of an elastomer material however it should be noted that any other resilient rubber, plastic, or ceramic-like material may be used depending on the needs of the radial shaft seal 12. The radial shaft seal 12 also includes an insert member 20 which is molded directly into the outer periphery of the radial shaft seal 12. The insert member 20 generally has a L-shaped cross section and is made of a steel material, preferably a carbon-steel, however it should be noted that any other metal material or rigid ceramic or plastic may be used depending on the operating environment. The bottom portion 22 of the insert member 20 is exposed from the bottom surface of the seal body 18, while the up-right portion of the insert member 20 is completely molded within the seal body 18. The seal body 18 also includes a plurality of locator gaps 24 which are equally spaced about the outside circumference of the seal body member 18. These locator gaps 24 are used to locate the insert member 20 with relation to the shaft 26. In the preferred embodiment the outer surface of the seal body 18 includes a plurality of ring-like ribs 28. The ring-like ribs 28 are used to engage and secure the radial shaft seal 12 into the prescribed opening. The seal body 18 also includes a circumferential trough 30 that generally has a U-shaped cross section. Within the trough there is a groove used to hold, locate and secure a ring spring 32 within the seal body environment. The ring spring 32 is used to urge the primary sealing lip 14 into constant contact with the shaft 26 being sealed.

The radial shaft seal 12 also includes a back-up ring 34 which is preferably made of a nylon material, however any other plastic or ceramic material may be used depending on the operating environment of the radial shaft seal 12. The back-up ring 34 also includes a scraper lip 36 which comes into contact with the shaft 26 and keeps any debris from entering the primary sealing lip area from the air side of the seal 12. The back up ring 34 is used to retain the elastomer such that the elastomer will not squeeze, flow, and fracture under pressure therefore not allowing a gap to form on the sealing lip area. The back up ring 34 is located on the inner diameter of the radial shaft seal 12 and located within a notch on the bottom part of the radial shaft seal 12.

The radial shaft seal 12 also includes a primary sealing lip 14 on its inside circumference such that the primary sealing lip 14 is in constant contact with the shaft 26. Fluid is in contact with the primary sealing lip 14 thus giving a seal that keeps a liquid from passing through around the shaft onto the air side of the radial shaft seal 12. The primary sealing lip 14 also includes a plurality parallel ribs 38, the ribs 38 are ring-like. The primary sealing lip 14 is further urged onto the shaft by the ring spring 32 which is placed within the circular trough of the seal body member 18.

The radial shaft seal 12 also includes a contaminate exclusion sealing lip 10 which is integrally molded above the primary sealing lip 14 of the radial shaft seal 12. The exclusion sealing lip 10 is designed with a venting feature 16 which allows system fluid to transfer to the primary sealing lip 14 thus establishing pressure equilibrium about the exclusion sealing lip when operating fluid pressure is applied to the sealing system. The exclusion sealing lip 10 is design to prohibit the ingestion of contaminates such as metal filings, dust, debris or other material found in the fluid of the system into the primary sealing lip area. The fluid is on the pressure side of the radial shaft seal thus the contaminates are forcefully sent to the primary sealing lip area. Prior art seals that do not include a contaminate exclusion sealing lip have been known to develop scratches from contamination, the scratches can be either axially oriented as is common with reciprocating sealing applications or circumferentially oriented as is common with rotating sealing applications. The scratches cause seal leakage and thus system failure prematurely. The exclusion sealing lip 10 is preferably molded but any other method of connecting may be used. The exclusion sealing lip 10 is circumferential in shape and extends such that it is in contact with the shaft 26.

The contamination exclusion sealing lip 10 is also designed with a venting feature 16 which allows the system fluid to transfer to the primary sealing lip 14. This will establish pressure equilibrium about the exclusion sealing lip when the system fluid pressure is applied. The venting feature assures that the pressurized system fluid does not apply distribution forces on the contaminate exclusion sealing lip 10 as it does on the primary sealing lip 14. This will assure that the exclusion sealing lip 10 does not have increased lip to shaft contact, increased lip operating temperatures, premature lip wear and lip extrusion damage. The venting feature 16 also assures that the system fluid is kept on the primary sealing lip 10 thus insuring that it does not run dry which can lead to increased lip temperature and premature lip wear. The vent aperture 16 on the contaminate exclusion sealing lip 10 minimizes it's effect on the total circumferential contact coverage thus maximizing the seal exclusion lip's ability to exclude contamination from the primary sealing lip area. An alternate embodiment has the vent apertures 16 being added via mechanical cutting or piercing operation after the exclusion sealing lip 10 has been molded integrally about the primary sealing lip 14. The use of the contaminate exclusion sealing lip 10 eliminates the need for additional components to be added to the radial shaft seal and also ensures the dimensions and tolerances are built directly into the radial shaft seal therefore eliminating the difficulties inherent in maintaining dimensional and tolerance control over multiple assembled components. The use of an exclusion sealing lip also eliminates the possibility of insufficient assembly of a multiple component radial shaft seal and the possibility of disassembly of a multiple component radial shaft seal during shipping or assembly. The integral molded exclusion sealing lip also does not change the existing radial shaft seal manufacturing technology and it can be easily added into existing radial shaft seal designs. It should be noted that in an alternate embodiment there is a plurality of vent apertures 16 located on the exclusion sealing lip 10.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. A radial shaft seal used to seal a shaft in a pressurized fluid system, said seal including:

a resilient seal body generally having a circumferential shape, said seal body having a circumferential trough;

a rigid insert member molded within said seal body, said insert member having a L-shaped cross section;

a primary sealing lip located on an inside surface of said seal body, said primary sealing lip in contact with the shaft; and an exclusion lip integrally molded with said seal body directly above said primary sealing lip on a fluid side of said seal body, said exclusion lip generally having a circumferential shape, said exclusion lip is in contact with the shaft, said exclusion lip including a vent aperture, said vent aperture allows fluid to transfer to said primary sealing lip and assures distribution forces are not applied to said exclusion lip by the fluid.

2. The seal of claim 1 wherein said exclusion lip includes a plurality of vent apertures about its circumference.

3. The seal of claim 1 wherein said seal body includes a plurality of parallel ribs adjacent said primary sealing lip.

4. The seal of claim 1 further including a ring spring, said ring spring is located within said circumferential trough, said ring spring urging said primary sealing lip into contact with the shaft.

5. The seal of claim 1 further including a back up ring, said back up ring having a scraper lip, said scraper lip in contact with the shaft.

6. The seal of claim 1 wherein seal body is made of an elastomer.

7. The seal of claim 1 wherein said insert member is made of steel.

8. A radial shaft seal used to seal fluid around a shaft, said seal including:

- a resilient seal body generally having a circumferential shape, said seal body having a circular trough;
- a ring spring located in said trough, said ring spring urges a primary sealing lip into contact with the shaft;
- a rigid insert member molded into said seal body, said insert member generally having a L-shaped cross section;
- said primary sealing lip located on an inside surface of said seal body, said primary sealing lip in contact with the shaft;
- a plurality of parallel ribs on said inside surface of said seal body, said parallel ribs being adjacent to said primary sealing lip; and
- an exclusion lip integrally molded with said seal body above said primary sealing lip on a fluid side of said seal body, said exclusion lip generally having a circumferential shape, said exclusion lip is in contact with the shaft, said exclusion lip including a vent, said exclusion lip in contact with the shaft, said vent allowing the fluid to transfer to said primary sealing lip.

9. The seal of claim 8 further including a back up ring, said back up ring having a scraper lip, said scraper lip in contact with the shaft.

10. The seal of claim 8 wherein said exclusion lip includes a plurality of vents.

11. The seal of claim 8 wherein said seal body is made of an elastomer.

12. The seal of claim 8 wherein said exclusion lip is molded on a fluid side of the radial shaft seal.

* * * * *